United States Patent [19]

Baier

[11] Patent Number: 4,987,749
[45] Date of Patent: Jan. 29, 1991

[54] THERMISTOR PROBE FOR EXPOSED SENSING ELEMENT FOR DIRECT IMMERSION IN REFRIGERANT FLOWS

[75] Inventor: Terence D. Baier, La Crosse, Wis.

[73] Assignee: American Standard Inc., New York, N.Y.

[21] Appl. No.: 501,213

[22] Filed: Mar. 29, 1990

[51] Int. Cl.⁵ .............................................. G01K 1/08
[52] U.S. Cl. ...................................... 62/222; 29/612; 236/93 R; 374/148
[58] Field of Search ............... 374/208, 183, 179, 148; 236/93 R; 29/612; 62/222

[56] References Cited

U.S. PATENT DOCUMENTS

| | | | |
|---|---|---|---|
| 3,059,443 | 10/1962 | Garner | 62/126 |
| 3,940,988 | 3/1976 | Reed | 374/148 |
| 4,090,371 | 5/1978 | Keane | 62/129 |
| 4,167,858 | 9/1979 | Kojima et al. | 62/126 |
| 4,385,658 | 5/1983 | Leonard | 165/11 |
| 4,571,951 | 2/1986 | Szymaszek | 62/212 |
| 4,653,288 | 3/1987 | Sayo et al. | 62/210 |
| 4,660,387 | 4/1987 | Usami | 62/184 |

FOREIGN PATENT DOCUMENTS 1150396  4/1969  United Kingdom ............... 374/148

Primary Examiner—William E. Wayner
Attorney, Agent, or Firm—William J. Beres; William O'Driscoll

[57] ABSTRACT

A fast response temperature probe, and method of manufacture, for use in the refrigerant line of a refrigeration system comprising: a temperature sensitive element; means for operably connecting the temperature sensitive element to a control line of a refrigeration system controller; an inner housing supporting the temperature sensitive element at a first end and enclosing the operable connection means; and an outer housing surrounding the temperature sensitive element and the inner housing, the outer housing including at least one aperture located in proximity to the temperature sensitive element.

26 Claims, 1 Drawing Sheet

THERMISTOR PROBE FOR EXPOSED SENSING ELEMENT FOR DIRECT IMMERSION IN REFRIGERANT FLOWS

BACKGROUND OF THE INVENTION

The present invention is directed to a temperature sensor for a refrigeration system, and more particularly, to a fast response temperature probe for direct immersion in the refrigerant flow line of a refrigeration system.

The addition of microprocessors and electronic expansion valves to refrigeration systems has demonstrated the need for a fast response temperature probe located in the refrigerant flow lines. Such a probe must be protected from damage from the force of refrigerant flow and from errors resulting from gas or contaminant accumulations.

Previous probes for direct immersion in refrigerant flow lines such as the probe shown in U.S. Pat. No. 4,571,951 to Szymaszek have been encased in a hard protective shell to prevent damage to the probe from the force of the refrigerant flow when the probe is located in the refrigerant flow line. Such probes are not fast response probes due to the delay incurred while the temperature of the refrigerant penetrates the protective shell.

Other probes such as shown in U.S. Pat. No. 4,167,858 to Kojima et al. and U.S. Pat. No. 3,059,443 to Garner show fast response probes used for measuring gas and contaminants to determine refrigerant dryness, but these probes are located in pockets above the refrigerant flow line. These probes are not located in the refrigerant flow lines because the force of the refrigerant flow damages the sensing elements of these types of probes.

Similarly U.S. Pat. Nos. 4,090,371 to Keane and 4,653,288 to Sayao et al. show fast response temperature probes which are located in a compressor and a liquid tank respectively. These probes are not located in liquid refrigerant flow lines and are not protected from the turbulent flow of refrigerant in a liquid refrigerant flow line.

SUMMARY OF THE INVENTION

It is an object of the invention to solve the problems of the prior art.

It is a further object of the invention to provide a fast response temperature probe which is suitable for direct immersion in the refrigerant flow lines of a refrigeration system.

It is a feature of the present invention to provide a temperature sensitive element which is supported on the end of an inner cylinder by a header, and which is protected from refrigerant flow by an outer cylinder having at least one aperture.

It is an advantage of the present invention that the temperature sensitive element is in direct contact with the refrigerant, but is protected from the force of the refrigerant flow.

It is a further feature of the present invention that vent holes are provided in the outer cylinder.

It is a further advantage of the present invention that accumulations of gas and contaminants are prevented.

The present invention provides a fast response temperature probe for use in the refrigerant line of a refrigeration system. The invention comprises a temperature sensitive element; a connection between the temperature sensitive element and a control line of a refrigeration system controller; an inner housing supporting the temperature sensitive element at a first and enclosing the operable connection means; and an outer housing surrounding the temperature sensitive element and the first end of the inner housing, the outer housing including at least one aperture located in proximity to the temperature sensitive element.

The present invention also provides a fast response temperature probe for use in the liquid line of a refrigeration system comprising: an inner cylinder having a first end; an outer cylinder surrounding the inner cylinder and including a projection extending axially beyond the first end of the inner cylinder, the projection including at least one aperture; means for bonding the inner and outer cylinders together; and a header located at the end of the inner cylinder, the header including means for sensing refrigerant temperature substantially enclosed by the projection of the outer cylinder.

The present invention further provides a refrigeration system comprising: a condenser; a compressor connected to the condenser by a hot gas line; an expansion valve connected to the condenser by a liquid line; an evaporator connected to the expansion valve by a refrigerant line and connected to the compressor by a suction line; a controller for monitoring and controlling the operation of the refrigeration system; and a fast response temperature sensor located either in the liquid line or in the refrigerant line. The temperature sensor includes a thermistor mounted on the first end of an inner cylinder by a sealing header, and wiring within the inner cylinder for connecting the temperature sensor to the system control means. The temperature sensor further includes an outer cylinder surrounding and sealingly engaging the inner cylinder, the outer cylinder having a first end which projects past a first end of the inner cylinder a sufficient distance to prevent the force of the refrigerant flow from directly impacting the thermistor. The outer cylinder also includes at least a first aperture in the projecting end which allows refrigerant to directly contact the thermistor.

The present invention also provides a process of manufacturing a fast response temperature probe for direct immersion in the refrigerant line of a refrigeration system. The process comprises the steps of: mounting a thermistor on a header so that an electrical connection exists between the header and the thermistor; pushing connecting wires from the thermistor through the inner cylinder; mounting the header to an end of the inner cylinder; affixing the header in place; placing a bonding means on the outside of an inner cylinder; mounting an outer cylinder on the inner cylinder so that the outer cylinder projects past an end of the inner cylinder and the thermistor; and bonding the outer cylinder to the inner cylinder.

DETAILED DESCRIPTION OF THE INVENTION

Figure 1:
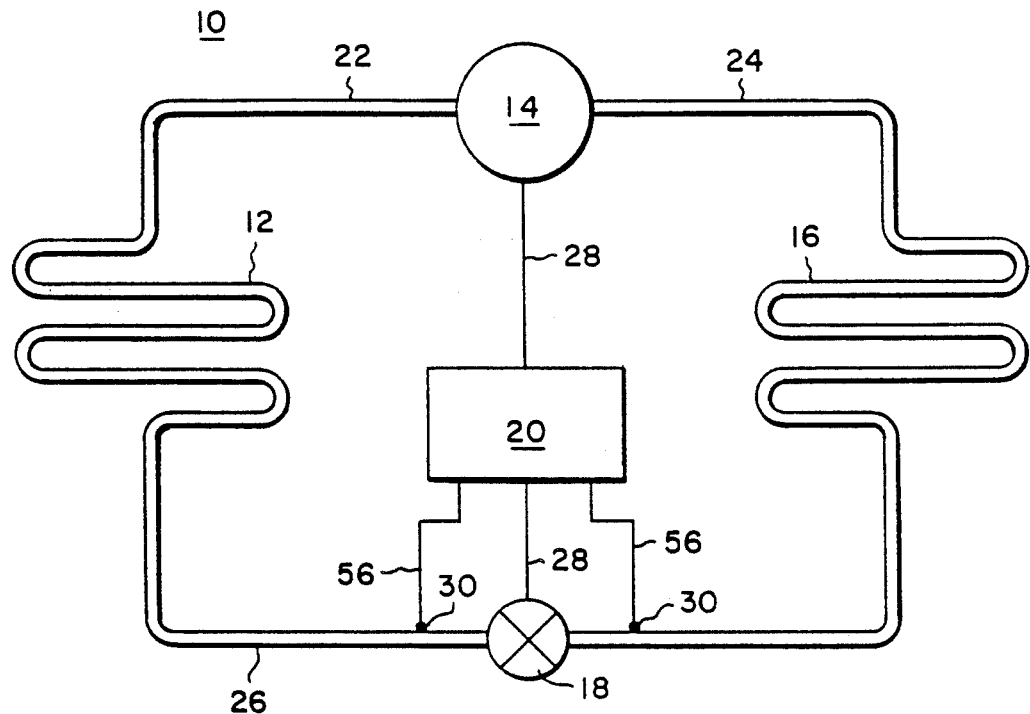
FIG. 1 is a block diagram of a refrigeration system showing the location of the fast response probe of the present invention.

FIG. 1 shows a refrigerant system 10 including an evaporator 12, a compressor 14, a condenser 16, an expansion valve 18, and a system controller 20. In the evaporator 12 refrigerant vaporizes while absorbing heat from a medium to be cooled. The vaporized refrigerant passes along a suction line 22 to the compressor 14 where the vaporized refrigerant is compressed to reduce its condensing temperature. The compressed refrigerant vapor is passed along a hot gas line 24 to a condenser 16, where the vapor is condensed back to a liquid by heat exchange with a cooling medium. The liquid refrigerant is then passed by a refrigerant line 26 back to the evaporator 12. The expansion valve 18 is provided in the refrigerant line 26 to maintain the high pressure differential created by the compressor 14. Various lines 28 allow the controller 20 to monitor and control the elements of the refrigeration system 10 including the operation of the compressor 14 and the expansion valve 18.

Figure 2:
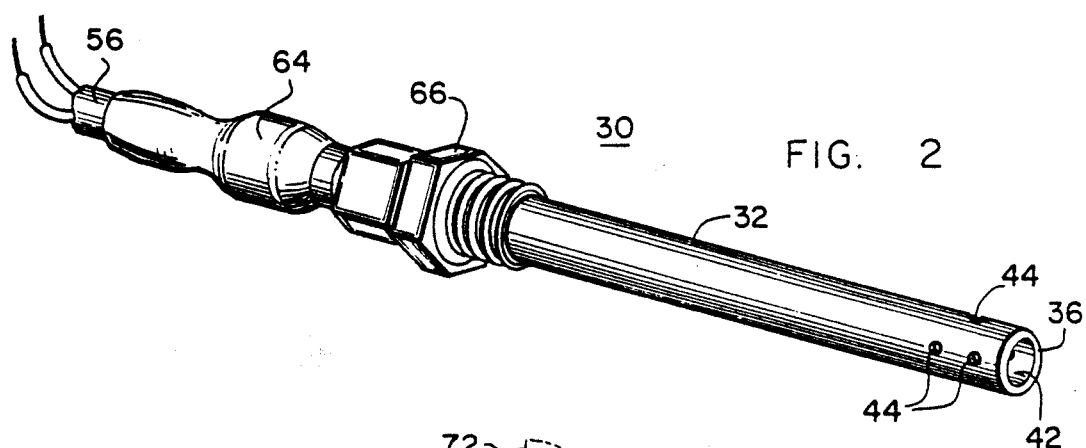
FIG. 2 is a perspective view of the fast response probe of the present invention with a compression coupling.
Figure 3:
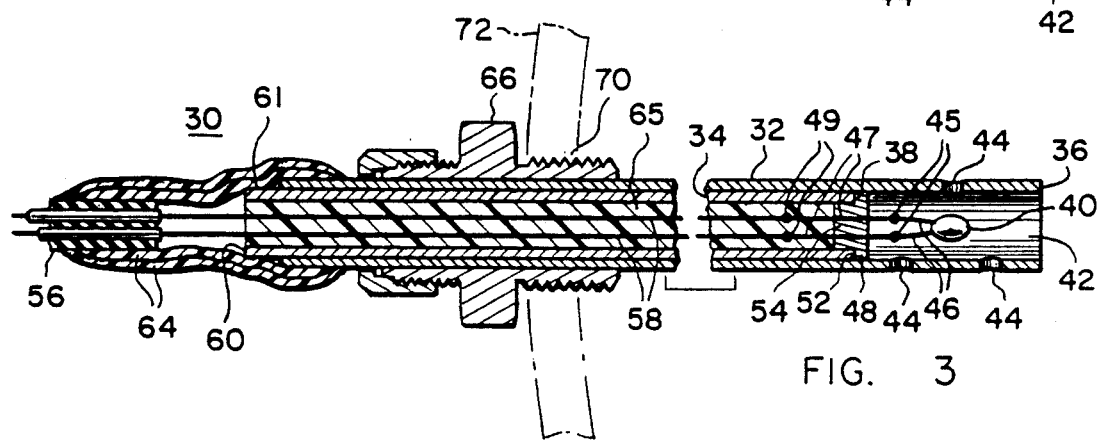
FIG. 3 is a cutaway view of the fast response probe of the present invention showing a portion of the refrigerant flow line.

The fast response refrigerant probe 30 of the present invention is located in the refrigerant line 26 on either or both sides of the expansion valve 18. The probe 30, which is shown more clearly in FIGS. 2 and 3, essentially includes a thermistor 40 protected by an outer cylinder 32 bonded to an inner cylinder 34. Both the outer and inner cylinders 32 and 34 are made of brass in the preferred embodiment but could be made of other suitable materials. The outer cylinder 32 has a refrigerant line end 36 which projects past the refrigerant line end 38 of the inner cylinder and acts as a protective shell for the thermistor 40. The projecting end 36 includes at least one aperture 42 to allow refrigerant to contact the thermistor 40 when the probe 30 is inserted in the refrigerant line 26. In the preferred embodiment this aperture 42 is located at the refrigerant line end 36 of the cylinder 32 and substantially encompasses the entire diameter of the cylinder 32. The aperture 42 could be located in the side walls of the outer cylinder 32, and could be smaller than the diameter of the outer cylinder 32. In either case, the outer cylinder 32 should include at least one vent hole 44 to prevent gas or contaminants from accumulating in the vicinity of the thermistor 40.

The thermistor 40 is a negative temperature coefficient thermistor in the preferred embodiment, and includes a pair of wires 46. The thermistor wires 46 are soldered to a first end 45 of a pair of header wires 47 which are mounted in a header 48 made of glass formed around the header wires 47. The header is sized to fit within the outer cylinder 32 and mount on the end 38 of the inner cylinder 34. The header 48 includes a flange 52 which engages the refrigerant line end 38 of the inner cylinder 34 as a shoulder, and a portion 54 of the header 48 which extends within the inner cylinder 34. The header 48 is soldered to the refrigerant line end 38 of the inner cylinder 34. The thermistor 40 and the portions of the wires 46 which are exposed to refrigerant flow are also coated by an insulating epoxy. The coating prevents electrical shorts caused by contaminants lodging between the thermistor wires 46.

Prior to assembly, the second ends 49 of the header wires 47 are soldered to a pair of insulated wires 58, and the insulated wires 58 and the header wires 47 are pushed within the inner cylinder 34 when the header 48 is being positioned on the refrigerant line end 38 of the inner cylinder 34. The insulated wires 58 extend through the inner cylinder 34 and connect with a cable 56 which in turn provides an electrical connection between the probe 30 and the controller 20. The cable 56 is sealed with a seal 64 such as a heat shrink wrap. In the preferred embodiment a second layer of heat shrink wrap 64 is also used. It has also been found desirable to fill the inner cylinder 34 with an epoxy 65 to prevent the insulating and header wires 58, 47 from moving once the assembly is complete. In the preferred embodiment a small amount of a quick drying epoxy is used to retain the insulating and header wires 58, 47, then the inner cylinder 34 is backfilled with a sealing epoxy. A conventional fitting 66 such as those manufactured by Swagelok is then mounted on the outer cylinder 32 of the probe 30, and used to secure the probe 30 within an aperture 70 in the refrigerant flow line wall 72.

The probe 30 is assembled in the following manner. The thermistor 40 is joined to the header 48 by soldering the thermistor wires 46 to the first end 45 of the header wires 47. The insulating wires 58 are then soldered to a second end 49 of the header wires 47. The insulating wires 58 are then pushed through the cylinder, and the header flange 52 engaged with the refrigerant line end 38. The header 48 is then soldered to the inner cylinder 34. The thermistor wires 46 and the exposed header wires 47 are then coated with a protective sealant for electrical insulation from contaminants. A projecting end 60 of the inner cylinder 34 is tinned or plated with solder. The inner cylinder 34 is then slid within the outer cylinder 32 and the two cylinders 32 and 34 brazed together so that the refrigerant line end 36 of the outer cylinder 32 projects past the refrigerant line end 38 of the inner cylinder 34, and a portion 61 of the inner cylinder 34 extends beyond the outer cylinder 32 to provide a bonding and sealing surface. The inner cylinder 34 is then filled with an epoxy 65, and the insulating wires 58 are soldered to the cable 56. As previously mentioned, in the preferred embodiment the epoxy 65 comprises two separate epoxies, a first quick drying epoxy which is initially applied at the inner side of the header 48 to retain the insulating and header wires 58, 47, and a second sealing epoxy to actually fill the inner cylinder 34. At least one heat shrink wrapping 64 is slid over the probe 30 and heat shrunk into place. The Swagelok fitting 66 is then mounted on the probe 30 in a conventional manner.

The temperature probe of the present invention is a fast response temperature probe suitable for direct immersion in turbulent refrigerant flows and protected from the accumulation of gases or other contaminants.

Although the preferred embodiment is described above, it is apparent that many alterations and modifications may be made without departing from the subject invention. It is intended that all such alterations and modifications be considered to be within the spirit and scope of the invention as defined in the following claims.

What is claimed and desired to be secured by Letters Patent of the United States is:

1. A fast response temperature probe for use in the refrigerant line of a refrigeration system comprising:
 a temperature sensitive element;
 means for operably connecting the temperature sensitive element to a control line of a refrigeration system controller;

an inner housing supporting the temperature sensitive element at a first end and enclosing the operable connection means; and an outer housing surrounding the temperature sensitive element and the first end of the inner housing, the outer housing including at least one aperture located in proximity to the temperature sensitive element wherein the temperature sensitive element is mounted on a header, and the header is mounted on the first end of the inner housing.

2. The probe of claim 1 wherein the temperature sensitive element is a thermistor.

3. The probe of claim 2 wherein the inner and outer housings are cylindrical and bonded together.

4. The probe of claim 1 wherein the inner housing contains a sealant which substantially fills the inner housing.

5. The probe of claim 4 wherein the sealant includes a small amount of quick drying epoxy located in Proximity to the first end and a sealing epoxy substantially filling the remainder of the inner housing.

6. The probe of claim 1 further including means, associated with the outer housing, to vent gases and contaminants.

7. A fast response temperature probe for use in the liquid line of a refrigeration system comprising:

an inner cylinder having a first end;

an outer cylinder substantially surrounding the inner cylinder and including a projection extending axially beyond the first end of the inner cylinder, the projection including at least one aperture;

means for bonding the inner and outer cylinders together, and a header located at the end of the inner cylinder, the header including means for sensing refrigerant temperature substantially enclosed by the projection of the outer cylinder.

8. The probe of claim 7 wherein the temperature sensing means includes a thermistor, the thermistor having means for operably connecting through the inner cylinder to a refrigeration system controller.

9. The probe of claim 7 further including means, in proximity to the outer cylinder, for sealing a gap in a refrigerant flow line wall when the probe is inserted through the gap into the flow line.

10. The probe of claim 7 wherein the projection of the outer cylinder includes means to vent gases and contaminants.

11. The probe of claim 10 wherein the vent means includes at least one vent aperture in the projection of the outer cylinder.

12. The probe of claim 7 wherein the aperture is located at a first end of the outer cylinder and the aperture is substantially equal in diameter to the inner cylinder.

13. The probe of claim 7 further including means for attaching the header to the first end of the inner cylinder.

14. The probe of claim 13 including an epoxy substantially filling the inner cylinder.

15. The probe of claim 7 wherein the inner and outer cylinder are formed of brass, a heat shrink wrap encloses a second end of the outer cylinder and a second end of the inner cylinder, a compression fitting is mounted on the outer cylinder for retaining the probe in place during use, and the header is formed of glass.

16. A refrigeration system comprising:
a condenser;
a compressor connected to the condenser by a hot gas line;
an expansion valve connected to the condenser by a liquid line;
an evaporator connected to the expansion valve by a refrigerant line and connected to the compressor by a suction line;
means for monitoring and controlling the operation of the system; and
a fast response temperature sensor located in the liquid line or in the refrigerant line;
the temperature sensor including an inner cylinder, a sealing header, a thermistor mounted on a first end of the inner cylinder by the sealing header, and means within the inner cylinder for connecting the temperature sensor to the system control means;
the temperature sensor further including an outer cylinder surrounding and sealingly engaging the inner cylinder, the outer cylinder having a first end projecting past the first end of the inner cylinder a sufficient distance to prevent the force of refrigerant flow from directly impacting the thermistor, the outer cylinder also including at least a first aperture in the projecting end which allows refrigerant to directly contact the thermistor.

17. The system of claim 16 wherein the aperture is formed at the first end of the outer cylinder.

18. The system of claim 17 wherein the outer cylinder includes at least a second aperture in the wall of the first end of the outer cylinder.

19. The system of claim 18 wherein the second aperture is smaller then the first aperture.

20. The system of claim 16 wherein the first aperture is located in the wall of the first end of the outer cylinder.

21. The system of claim 16 wherein the inner cylinder is filled with an epoxy.

22. The system of claim 16 wherein the connection means includes an electrical cable engaged to a second end of the inner cylinder, and means to seal the engagement.

23. A process of manufacturing a fast response temperature probe for direct immersion in the refrigerant line of a refrigeration system comprising the steps of:
mounting a thermistor on a header so that an electrical connection exists between the header and the thermistor;
pushing connecting wires from the thermistor through the inner cylinder;
mounting the header to an end of the inner cylinder;
affixing the header in place;
placing a bonding means on the outside of an inner cylinder;
mounting an outer cylinder on the inner cylinder so that the outer cylinder projects past the end of the inner cylinder and the thermistor; and
bonding the outer cylinder to the inner cylinder.

24. The process of claim 23 further including the step of filling the inner cylinder with a sealant.

25. The process of claim 24 wherein the step of filling the cylinder with a sealant includes applying a small amount of a quick drying epoxy to an inner side of the header and filling the remainder of the cylinder with a sealing epoxy.

26. The process of claim 23 including the further step of coating the thermistor and the electrical connection between the header and the thermistor with an insulating sealant.

* * * * *